United States Patent
Song

(10) Patent No.: US 6,502,202 B1
(45) Date of Patent: Dec. 31, 2002

(54) SELF-ADJUSTING MULTI-SPEED PIPELINE

(75) Inventor: Seungyoon P. Song, Palo Alto, CA (US)

(73) Assignee: Elan Research, Mountain View, CA (US)

(*) Notice: Subject to any disclaimer, the term of this patent is extended or adjusted under 35 U.S.C. 154(b) by 23 days.

(21) Appl. No.: 09/680,672

(22) Filed: Oct. 6, 2000

(51) Int. Cl.$^7$ ................................................. G06F 1/04
(52) U.S. Cl. ........................ 713/501; 712/200; 713/600
(58) Field of Search ................................. 713/500, 501, 713/503, 600, 601; 712/200, 219

(56) References Cited

U.S. PATENT DOCUMENTS

| | | | |
|---|---|---|---|
| 5,553,276 A | 9/1996 | Dean | 395/550 |
| 5,574,925 A | 11/1996 | Paver | 395/800 |
| 5,987,620 A | 11/1999 | Tran | 713/600 |
| 6,182,233 B1 * | 1/2001 | Schuster et al. | 713/400 |

* cited by examiner

*Primary Examiner*—Dennis M. Butler
(74) *Attorney, Agent, or Firm*—Sawyer Law Group LLP

(57) ABSTRACT

A self-adjusting multi-speed pipeline in accordance with the present invention is disclosed. A self-adjusting multi-speed pipeline is aware of the required processing time of the slowest among the stages that are actually used in each cycle and to adjust the clock speed accordingly. Intelligence is added to the pipeline to detect when one or more of slower pipeline stages are to be used in each cycle. A clock generator observes these detection signals and increases or decreases the clock period in each cycle to ensure that the slowest pipeline stage completes its processing. The biggest benefit of such a pipeline is improved performance since the pipeline can now operate more efficiently. The speed of the pipeline is reduced only enough for the slowest stage in each cycle to complete its processing. Another benefit is that less effort can be spent in reducing the required processing time of slower pipeline stages, resulting in simpler and smaller systems and shorter design time without sacrificing the overall performance.

14 Claims, 4 Drawing Sheets

$T_0 = P\_175\% \cdot Clock\_Stretch\_Enable$ $T_1 = \overline{P\_175\%} \cdot P\_150\% \cdot Clock\_Stretch\_Enable$ $T_2 = \overline{P\_175\%} \cdot \overline{P\_150\%} \cdot P\_125\% \cdot Clock\_Stretch\_Enable$ $T_3 = \overline{P\_175\%} \cdot \overline{P\_150\%} \cdot \overline{P\_125\%} + \overline{Clock\_Stretch\_Enable}$ $T_0$ = (P_25% + P_50% + P_75%) • Clock_Stretch_Enable $T_1$ = P_50% + P_75%

$T_2$ = P_75%

$T_{75}$ = Clock_Stretch_Enabled • P_75%

$T_{50}$ = Clock_Stretch_Enabled • P_50% • $\overline{\text{P\_75\%}}$ $T_{25}$ = Clock_Stretch_Enabled • P_25% • $\overline{\text{P\_75\%}}$ • $\overline{\text{P\_50\%}}$ $T_0$ = $\overline{\text{Clock\_Stretch\_Enabled}}$ + $\overline{\text{P\_75\%}}$ • $\overline{\text{P\_50\%}}$ • $\overline{\text{P\_25\%}}$

SELF-ADJUSTING MULTI-SPEED PIPELINE

FIELD OF THE INVENTION

The present invention relates generally to digital systems and more particularly to increasing the processing speeds of the digital systems.

BACKGROUND OF THE INVENTION

Most digital systems are organized into a number of processing stages, known as pipeline stages, to increase their throughput. An N-stage pipelined system may require N cycles to produce one result but it can also produce N number of results in that same N number of cycles. Since pipelined systems must operate at the speed of the slowest pipeline stage, much effort is spent in increasing the processing speed of the slowest pipeline stage.

Accordingly, what is needed is a system and method for increasing the overall processing speed of digital systems. The present invention addresses such a need.

SUMMARY OF THE INVENTION

A self-adjusting multi-speed pipeline in accordance with the present invention is disclosed. A self-adjusting multi-speed pipeline is aware of the required processing time of the slowest among the stages that are actually used in each cycle and to adjust the clock speed accordingly. Intelligence is added to the pipeline to detect when one or more of slower pipeline stages are to be used in each cycle. A clock generator observes these detection signals and increases or decreases the clock period in each cycle to ensure that the slowest pipeline stage completes its processing.

The biggest benefit of such a pipeline is improved performance since the pipeline can now operate more efficiently. The speed of the pipeline is reduced only enough for the slowest stage in each cycle to complete its processing. Another benefit is that less effort can be spent in reducing the required processing time of slower pipeline stages, resulting in simpler and smaller systems and shorter design time without sacrificing the overall performance.

DETAILED DESCRIPTION

The present invention relates generally to digital systems and more particularly to increasing the processing speeds of the digital systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A digital system operates in synchronous mode, if it uses a global clock for synchronization, and in asynchronous mode, if it does not use a global clock. For a synchronous system to work correctly, the clock period must be longer than the required processing time through any pipeline stage. For an asynchronous system to work correctly, the interface between each pipeline stage must use a handshake protocol, informing each other when their output signals are valid and when the other's valid output signals are no longer needed. An asynchronous system can operate more efficiently and consume less power than its synchronous counterpart in theory, since its processing time is just long enough for the slowest stage to complete. The theoretical benefits are difficult to realize in practice, however, since an asynchronous system is much more difficult to design and build than its synchronous counterpart. The self-adjusting multi-speed pipeline optimization offers a way to harness the benefits of asynchronous systems while using the simpler and well-understood and established synchronous design method.

The self-adjusting multi-speed pipeline optimization uses the notion of multiple speed classes, into which each pipeline stage is assigned permanently or dynamically, that is, a pipeline stage can be assigned to different speed classes in different cycles as explained in the first example below. In contrast, existing pipeline designs use only one permanent speed class, the slowest class into which every pipeline stage is assigned. The goal of the classification is to identify those stages that are used infrequently into slower classes so that the clock period can be lengthened to the appropriate duration only during the cycles in which those stages are actually being used. Although the number of speed classes used in a system can be arbitrary, depending on the desired degree of optimization, using as few as two or three classes can provide most of the benefits of the optimization.

Figure 1:
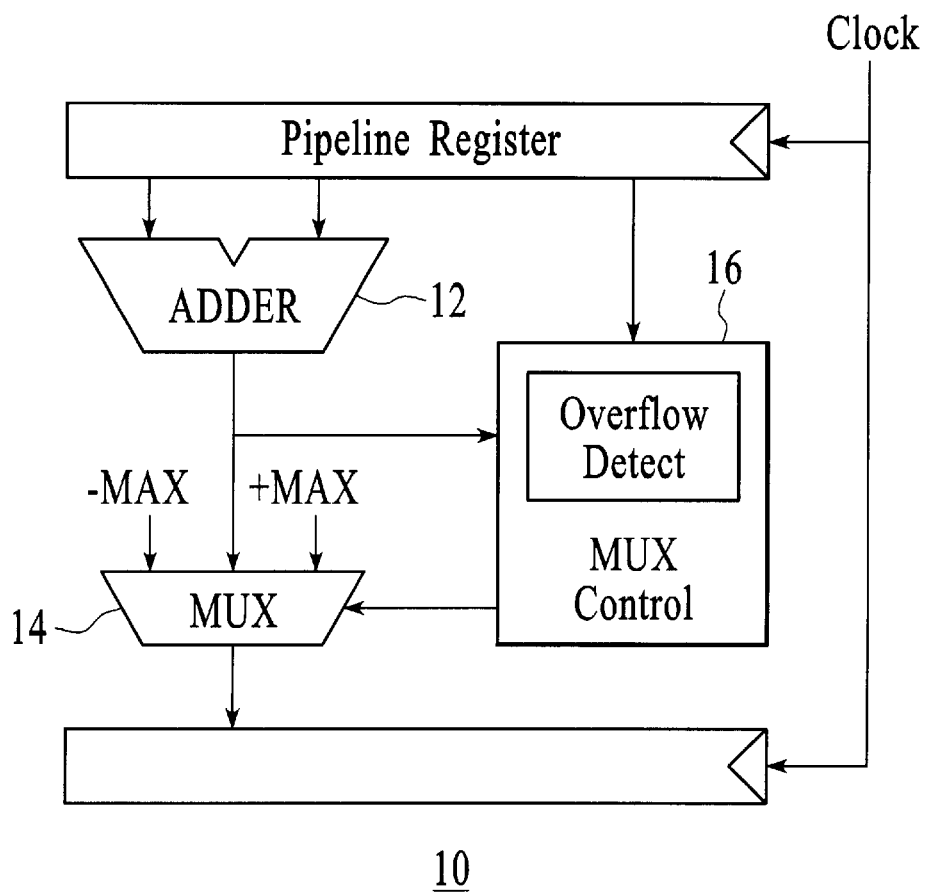
FIG. 1 shows a multi-speed pipeline that consists of an adder and a multiplexor and its control logic.

The notion of multiple speed classes can be best illustrated using a hypothetical saturating adder stage 10, which consists of an adder 12 and a multiplexor 14 and its control logic 16, as shown in FIG. 1. When the stage 10 is performing a non-saturating addition, the multiplexor control logic 16 simply selects the adder 12 output. When the stage 10 is performing a saturating addition, however, the control logic 16 must first check if the addition produces an overflow condition (a result that requires more bits to represent than provided in the hardware). If a positive overflow occurs, the control logic 16 must select the most positive number that can be represented in the hardware instead of the adder 12 output. Similarly, if a negative overflow occurs, the control logic 16 must select the most negative number that can be represented in the hardware instead of the adder 12 output. In this example, the saturating adder stage 10 can be classified into the fastest class when it performs a non-saturating addition and into a slower class when it performs a saturating addition, since more time is needed to check for overflow conditions in the multiplexor control logic when performing a saturating addition. This example points out that some pipeline stages are best designed to operate at multiple speeds when they contain logic for multiple functions that share common logic.

A second example illustrates that some pipeline stages are used less frequently than others. Consider an integer multiply unit implemented in three pipeline stages in a microprocessor. If a designer expects integer multiply operations to be used less frequently than most other integer operations, the designer can classify all three stages of the multiply unit into one or more of slow classes. This would permit the designer to use slower but smaller circuits in the three multiply stages without affecting the clock speed while the other integer stages are in use.

It is important to realize that some or all of the three multiply stages and the adder stage (when performing a saturating addition) from the previous examples can be classified into one slow speed class, even if they all have different speed requirements. The speed of a slow class may be best defined as some percentage slower than the speed of the fastest class. For instance, the speed of the medium and slowest classes can be defined to be 12.5% and 50% slower, respectively, than the speed of the fastest class.

It is also useful to give software a way to control the clock period for one cycle. For instance, systems can provide a CLOCK_STRETCH instruction that performs no function other than increases the clock period for one cycle when the instruction reaches a certain pipeline stage. Such an instruction is useful for debugging speed failures, in which systems fail to operate correctly under certain conditions at speeds slower than expected. One way to identify the pipeline stage that causes a speed failure is to increase the period of the clock cycle during which the suspected pipeline stage produces erroneous outputs. If the suspected pipeline stage produces correct outputs with a longer clock period, then the suspicion is correct. Providing a CLOCK_STRETCH instruction makes debugging speed failures much easier. For such an instruction to be useful for identifying speed failures in all speed classes, the clock generator must lengthen the clock period sufficiently longer than required by the slowest class.

The CLOCK_STRETCH instruction can also be used to provide workaround solutions for unexpected design bugs that cause speed failures under certain conditions without such workaround solutions, the systems must operate at slower speeds under all conditions. For instance, microprocessors can offer a set of CLOCK_STRETCH instructions for software to lengthen the clock period when a CLOCK_STRETCH instruction reaches a certain pipeline stage, such as the decode, register file read, execute, and so on. Each CLOCK_STRETCH instruction can also specify a speed class to be more useful, so that the clock period can be lengthened just long enough for the pipeline stage containing the design bug to complete processing.

Without specifying each and every case, it is suffice to say that there are many places in existing pipelined systems where the self-adjusting multi-speed pipeline optimization can be applied to improve performance and reduce circuit size.

A self-adjusting clocking mechanism consists of a set of speed-class detectors and a clock generator that can adjust the clock period every cycle, based on the inputs from the detectors. One or more speed-class detectors are associated with each pipeline stage that is classified into a slow speed class. They determine and inform the clock generator every cycle whether or not the associated stage is being used in the current cycle. The clock generator monitors the signals from all speed-class detectors and chooses the clock period that will accommodate the speed need of the slowest class. To allow sufficient time for the clock generator to receive these signals, determine the slowest class currently in use and adjust the clock period, the speed-class detectors must generate their outputs early in each cycle. It may be necessary for some speed-class detectors to determine whether or not their associated stage will be used a cycle later, register their outputs and then inform the clock generator early in the next cycle, thereby providing sufficient time for the clock generator to adjust the clock period.

Figure 2:
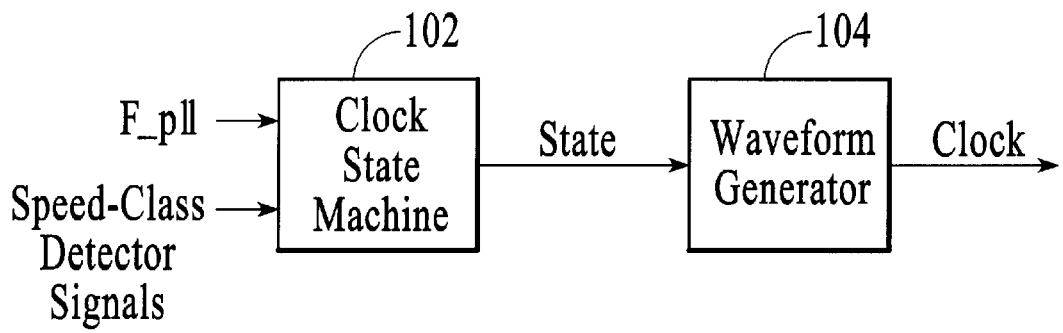
FIG. 2 shows a preferred implementation of a clock generator that can increase or decrease its clock period.

A preferred implementation of a clock generator 100 that can increase or decrease its clock period is shown in FIG. 2. The clock generator 100 comprises a clock state machine 102 whose outputs are used by a waveform generator 104 to produce a glitch-free clock. An input to the clock state machine is a fast clock F_pll, which may be an output of a PLL (phase-locked loop).

Figure 3:
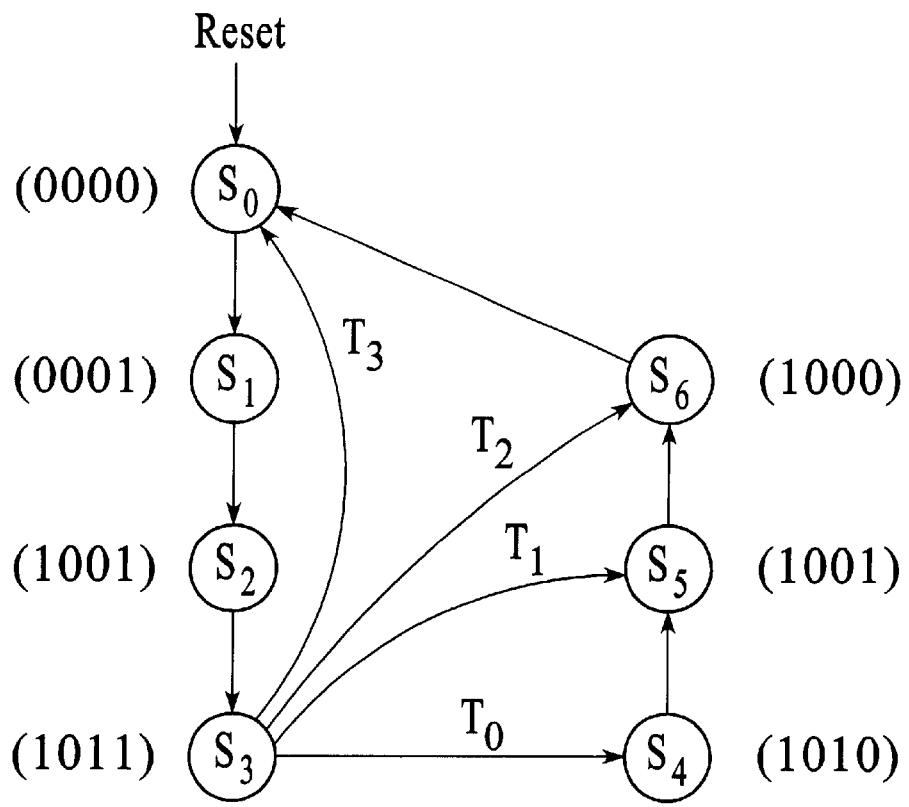
FIG. 3 shows the state diagram of a clock generator that can stretch the clock period.

FIG. 3 shows the state diagram of a clock generator that can stretch the clock period by 25% increments—from the shortest to 125%, 150% and 175% of the shortest period. The state machine is advanced at the rate of the F_pll clock, so that the period of the fastest speed class when the state machine transitions between S0, S1, S2, and S3 is 4 times longer than the period of the F_pll clock. It is desirable to enable clock stretching only when needed, since if the system is operating at a speed much slower than required by the slowest class, such as in a low-power mode, there is no need to enable clock stretching.

When the state machine is at the S3 state and when clock stretching is enabled, it checks the inputs from the speed-class detectors to determine its next state. If a detector in the slowest class asserts its P_175% signal, the state machine enters the S4 state, so that it will transition to S5, S6 and then to S0 state in the next three F_pll clock cycles. The resulting clock period is 7 times longer than the period of the F_pll and is 75% longer than the period of the fastest class. If a detector asserts P_150% signal, the P_175% signal is not asserted and clock stretching is enabled, then the state machine enters the S5 state, so that it will transition to S6 and then S0 state in the next two F_pll clock cycles. The resulting clock period is 50% longer than the period of the fastest class. Similarly, when only the P_125% signal is asserted and clock stretching is enabled, the resulting clock period is 25% longer than the period of the fastest speed class. When no detector asserts its signal or clock stretching is disabled, the state machine enters the S0 state, producing the period of the fastest class that is 4 times longer than the F_pll clock period.

There are many ways to generate a glitch-free waveform from a state machine, and they are well known in the industry. FIG. 3 also shows 4-bit state assignments that can be used to generate a glitch-free clock—the clock is simply the left most bit of the state variable. With these state assignments, the clock is low when the state machine is in S0 and S1 states and high when the state machine is in any other states. The resulting clock does not have 50% duty cycle—meaning the clock high and low durations in a cycle are unequal, but that may be acceptable if clock stretching occurs infrequently.

Figure 4:
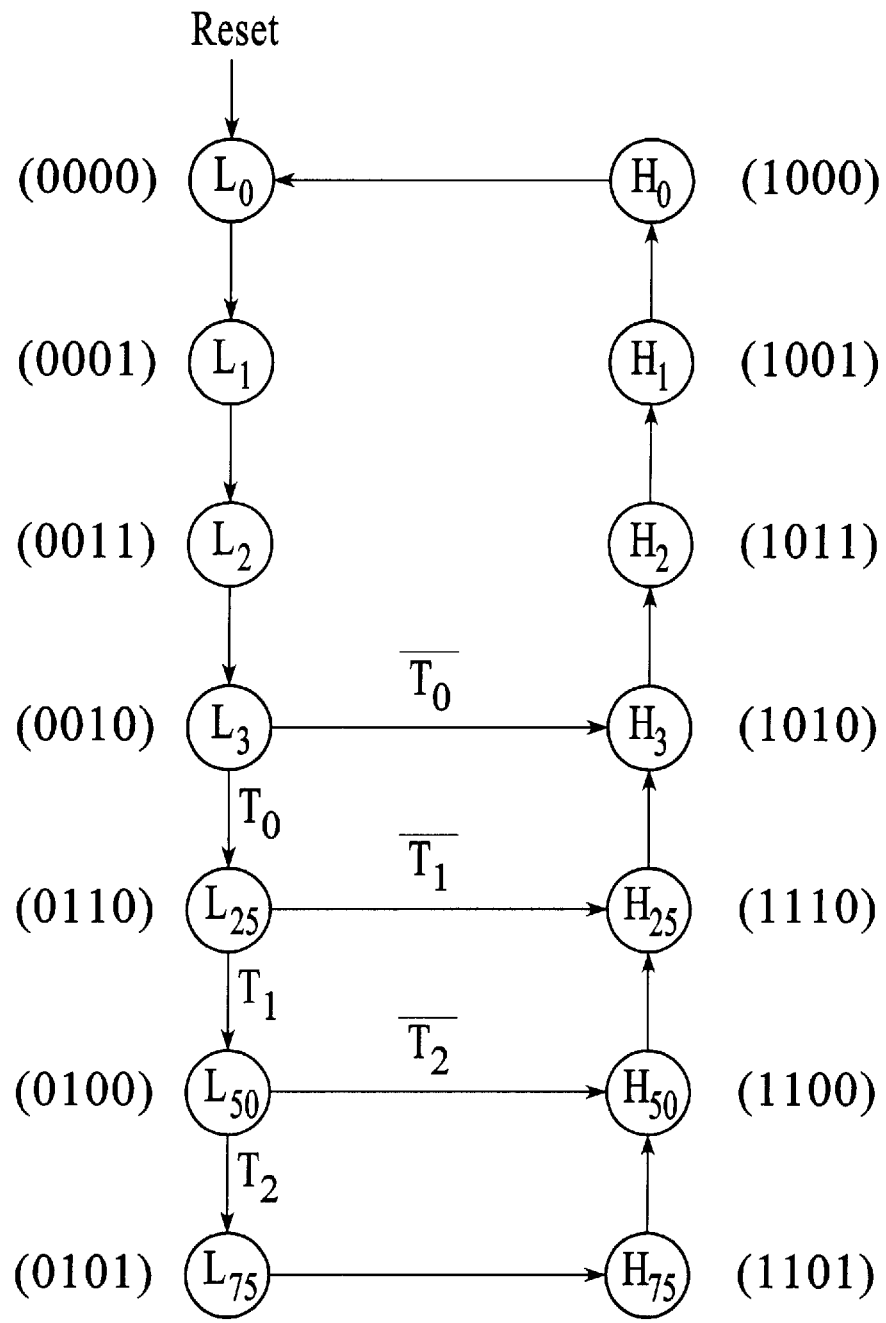
FIG. 4 shows the state diagram of another clock generator that can stretch the clock period while maintaining a 50% duty cycle.

FIG. 4 shows the state diagram of another clock generator that can also stretch the clock period by 25%, 50% or 75%. This state machine uses additional states to produce the clock with 50% duty cycle. The clock is simply the left most bit of the state variable, so that it is low when the state machine is in any of the states on the left side (L0—L3, L25, L50 or L75) and high when the state machine is in any of the states on the right side (H0—H3, H25, H50 or H75). A penalty for using additional states to generate the clock with 50% duty cycle is that period of the fastest speed class is now 8 times the period of the F_pll clock. It should also be evident that more states can be used in the clock state machine to stretch the clock period with a finer granularity than 25% used in the above examples.

Many digital systems provide free-running counters that operate at a fixed frequency. To accommodate these counters, the clock generator can also generate a free-running clock, using another clock state machine that is advanced only by the F_pll clock and transitions repeatedly between S0, S1, S2, and S3.

Figure 5:
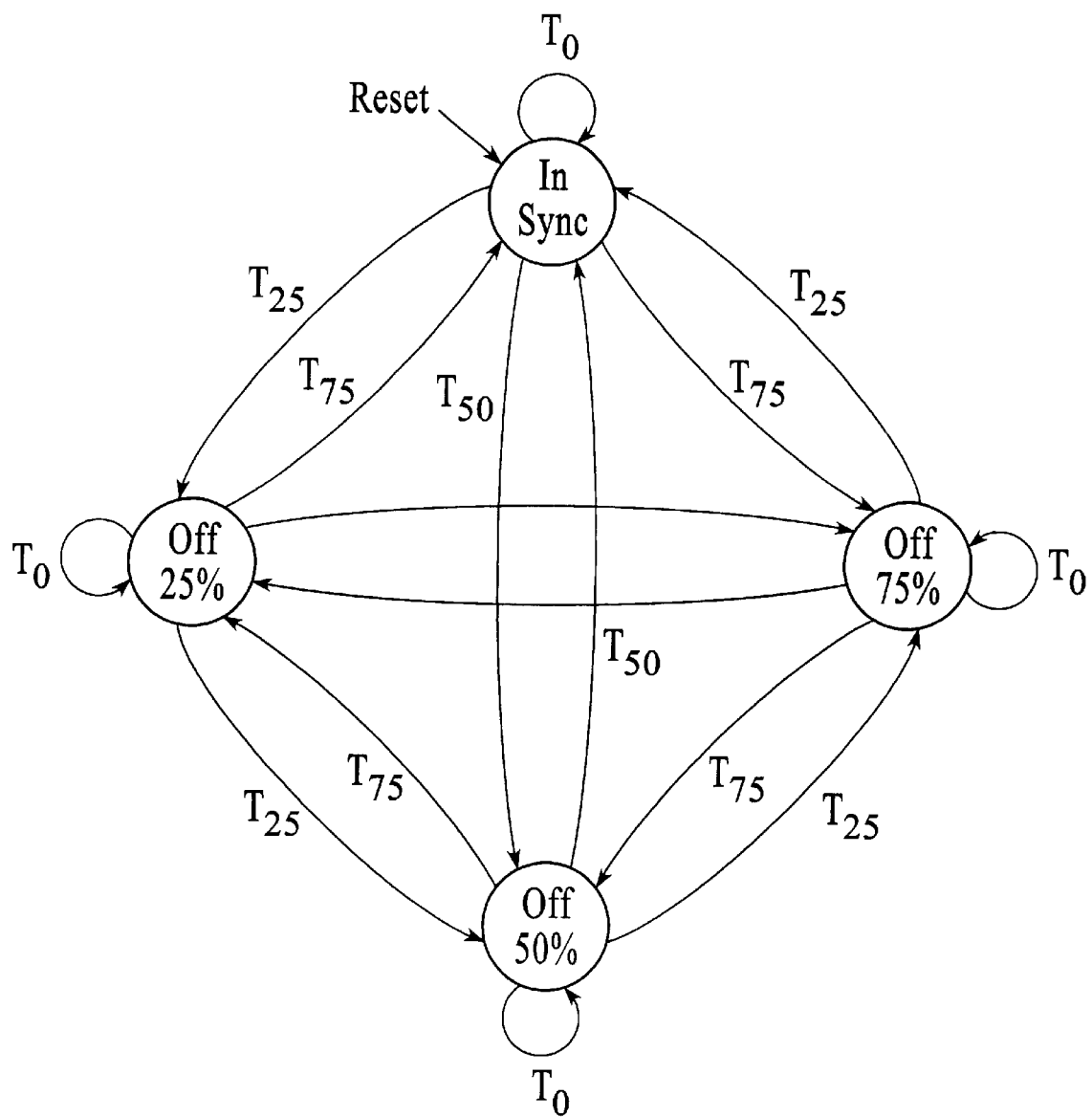
FIG. 5 shows the state diagram of a phase-difference state machine.

In some cases, it may be necessary to synchronize the free-running and adjustable clocks. To accommodate this, the clock generator can use another state machine that keeps track of the phase difference between the two clocks. FIG. 5 shows the state diagram of such a phase-difference state machine when the adjustable clock can be stretched by 25%, 50% or 75%. The phase-difference state machine works as follows. When it is in any one of the four states and when the clock is being stretched by 25%, for example, it transitions to the state that is different by an additional 25%. That is, the state machine would transition from IN-SYNC to OFF_25%, OFF_25% to OFF_50%, OFF_50% to OFF_75%, and from OFF_75% to IN-SYNC. The state machine would operate similarly when the clock is stretched by any other amount. The phase-difference state machine changes its state when the adjustable clock state machine is at the S3 state in the previous examples.

To synchronize the two clocks, the adjustable clock is stretched by 25% when the phase difference is 75%, indicated by the phase-difference state machine being in the OFF_75% state. Similarly, the adjustable clock is stretched by 50% or 75% when the phase difference is 50% or 25%, respectively. Phase synchronization can be initiated by software, if an instruction is provided for such purpose, or by an event that can be monitored by hardware, such as when a free-running counter is being read.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A digital system comprising:
    a fast speed class, the fast speed class comprising a plurality of circuits;
    at least one slow speed class coupled to the fast speed class, the slow speed class comprising at least one circuit;
    at least one slow speed class detection circuit coupled to the slow speed class; and
    a clock generator for receiving a signal from the at least one slow speed class detection circuit, wherein the clock generator adjusts its clock period based upon the signal without using a circuit that tracks the operational delay of the at least one circuit in the at least one slow speed class.

2. The digital system of claim 1 in which the clock generator produces a first clock whose period is longer than the required processing times of the plurality of circuits in the fast speed class in response to the at least one slow speed class detection circuit being in one logical state and whose period is longer than the required processing time of the at least one circuit in the at least one slow speed class in response to the at least one slow speed class detection circuit being in the other logical state.

3. The digital system of claim 2 in which the clock generator is not responsive to the at least one slow speed class detection circuit and produces the first clock whose period is longer than the required processing times of the plurality of circuits in the fast speed class.

4. The digital system of claim 2 in which the at least one slow speed class detection circuit determines whether or not the at least one circuit in the at least one slow speed class is being used in the current clock cycle.

5. The digital system of claim 2 in which the at least one slow speed class detection circuit determines whether or not the at least one circuit in the at least one slow speed class will be used in a subsequent cycle.

6. The digital system of claim 2 in which the state of the at least one slow speed class detection circuit is software controlled.

7. The digital system of claim 6 in which the software can specify one of the at least one slow speed class and the fast speed class.

8. The digital system of claim 2 in which the clock generator produces a second clock whose period is not affected by the state of the at least one slow speed class detection circuit.

9. The digital system of claim 8 in which the clock generator keeps track of the phase difference between the first and second clocks.

10. The digital system of claim 9 in which the clock generator stretches the first clock in response to the degree of the phase difference between the first and second clocks to synchronize the phase of the first and second clocks.

11. The digital system of claim 10 in which the synchronization is initiated by software.

12. The digital system of claim 10 in which the synchronization is initiated by hardware.

13. A digital system comprising:
    a fast speed class, the fast speed class comprising a plurality of circuits;
    at least one slow speed class coupled to the fast speed class, the slow speed class comprising at least one circuit;
    at least one slow speed class detection circuit coupled to the slow speed class; and
    a clock generator for receiving a signal from the at least one slow speed class detection circuit, wherein the clock generator adjusts its clock period based upon the signal; wherein the clock generator produces a first clock whose period is longer than the required processing times of the plurality of circuits in the fast speed class in response to the at least one slow speed class detection circuit being in one logical state and whose period is longer than the required processing time of the at least one circuit in the at least one slow speed class in response to the at least one slow speed class detection circuit being in the other logical state; and wherein the clock generator is not responsive to the at least one slow speed class detection circuit and produces the first clock whose period is longer than the required processing times of the plurality of circuits in the fast speed class.

14. A digital system comprising:
    a fast speed class, the fast speed class comprising a plurality of circuits;

at least one slow speed class coupled to the fast speed class, the slow speed class comprising at least one circuit;

at least one slow speed class detection circuit coupled to the slow speed class; and a clock generator for receiving a signal from the at least one slow speed class detection circuit, wherein the clock generator adjusts its clock period based upon the signal; wherein the clock generator produces a first clock whose period is longer than the required processing times of the plurality of circuits in the fast speed class in response to the at least one slow speed class detection circuit being in one logical state and whose period is longer than the required processing time of the at least one circuit in the at least one slow speed class in response to the at least one slow speed class detection circuit being in the other logical state; and wherein the clock generator produces a second clock whose period is not affected by the state of the at least one slow speed class detection circuit.

* * * * *